Figure 1:
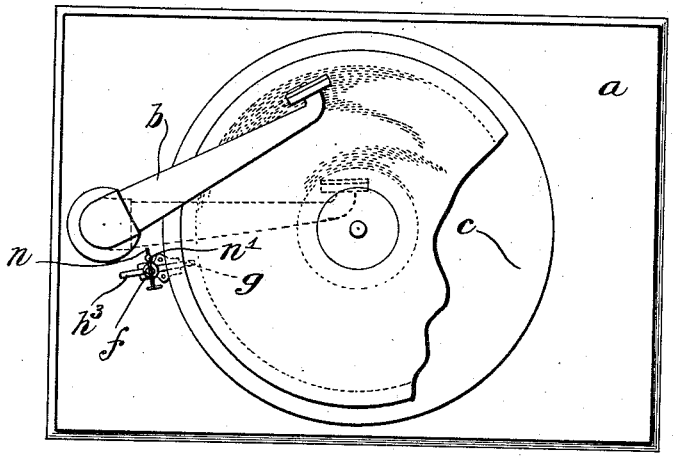

J. Q. A. ROLLINS.
AUTOMATIC STOP FOR PHONOGRAPHS.
APPLICATION FILED OCT. 31, 1913.

1,114,292.

Patented Oct. 20, 1914.

UNITED STATES PATENT OFFICE.

JUDGE Q. A. ROLLINS, OF NEW YORK, N. Y.

AUTOMATIC STOP FOR PHONOGRAPHS.

1,114,292.  Specification of Letters Patent.  Patented Oct. 20, 1914.

Application filed October 31, 1913. Serial No. 798,394.

*To all whom it may concern:*

Be it known that I, JUDGE Q. A. ROLLINS, a citizen of the United States, residing at the borough of Manhattan, in the city, county, and State of New York, have invented certain new and useful Improvements in Automatic Stops for Phonographs, of which the following is a specification, reference being had therein to the accompanying drawings, which form a part thereof.

My invention relates to automatic stops for phonographs, and more particularly to a device of this character adapted for use upon a phonograph having a revolving table for supporting a disk record.

The main object of the invention is to provide an automatic stop of this character wherein the brake may be released against light spring tension, and when the actuating mechanism is tripped, the spring energy developed when releasing the brake, will set the brake shoe through a lever which will multiply this spring energy in a manner to develop the requisite braking power.

A further object is to provide a stop of this character wherein the trip mechanism will project into the path of the tone arm and control a vertically movable plunger having a light spring under tension acting thereon, thus reducing the frictional resistance to the movement of the trip mechanism to a minimum.

A still further object is to provide a stop wherein the contact member of the trip mechanism may be set to accommodate the device to records of different lengths and a supporting means for said contact member will be provided upon the main casing of the device in a manner to secure a sufficiently great throw of the trip lever to insure a quick release of the brake mechanism.

A still further object is to provide a device of this character capable of using a friction pad or brake shoe of hard material, thus minimizing wear upon the pad or shoe and bringing the turn table to a gradual stop. And a still further object is to provide a device of this character which will occupy small space, thus permitting its application to cabinets of all sizes and avoiding any parts thereof projecting beyond the cabinet.

The invention consists primarily in an automatic stop for phonographs embodying therein an oscillatory lever, one end of which is adapted to project under the turn table of a phonograph, a friction pad or brake shoe supported by said end, means adapted to depress the other end of said lever whereby said pad or shoe is projected into frictional engagement with the turn table, and a trip mechanism embodying therein means coöperating with and adapted to hold said last named means inoperative or release the same, and a contact member adapted to be engaged by the swiveling arm of the phonograph; and in such other novel features of construction and combination of parts as are hereinafter set forth and described and more particularly pointed out in the claims hereto appended.

Figure 2:
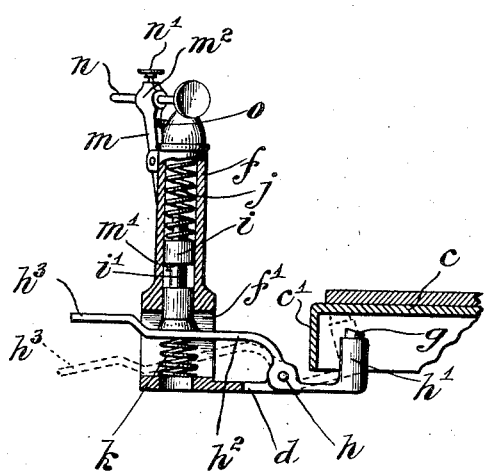
Figure 3:
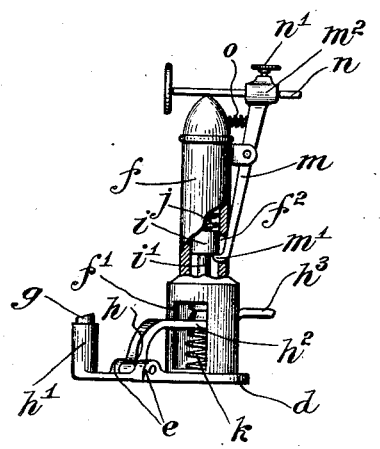

Referring to the drawings:—Figure 1 is a plan view of a phonograph with my automatic stop attachment applied thereto; Fig. 2 is a side elevation, partly in vertical section, showing the detailed mechanism of my improved stop; and Fig. 3 is an elevation of the device illustrating more particularly the construction and arrangement of the trip mechanism.

Like letters refer to like parts throughout the several views.

In the embodiment of my invention shown in the drawings, $a$ indicates the cabinet of a phonograph, $b$ the swiveling tone arm thereof, and $c$ the rotary record support or turn table. Mounted upon the top of the cabinet $a$ is a frame $d$ having a bearing $e$ adjacent one end thereof and a vertical cylinder $f$ adjacent the other end thereof. This frame is adapted to be so mounted adjacent the table $c$, that the bearings $e$ will be in close juxtaposition to the pendant rim $c'$ of the table $c$, sufficient clearance between the said rim and the cylinder $f$ being thus afforded to allow the larger diameter records to project beyond said table.

The friction pad or brake shoe $g$, is carried by one arm of an oscillatory lever $h$ mounted in the bearings $e$, the other arm of this lever projecting through the opening $f'$ at the base of the cylinder $f$. The shoe $g$ is mounted in a socket $h'$, the end of the lever $h$ being depressed so as to pass beneath the rim $c'$, said shoe $g$ being underneath the turntable $c$ and adapted to press against the under face thereof. The shoe $g$ is preferably made of wood fiber or other tough, hard material, so as to avoid a too sudden stoppage of the motor driving said table. The unfinished under surface of the table $c$ affords a better braking surface than the highly polished rim $c'$, and the material of the brake shoe may be determined without regard to the abrasive effect thereof upon an exposed portion of the instrument. The end $h^2$ of the lever $h$ is elevated with relation to the bearings $e$, the extreme end $h^3$ thereof serving as a tongue projecting beyond the cylinder $f$ by means of which the brake member $g$ may be released to permit the turn table to start. Seated in the cylinder $f$ is a vertically movable plunger $i$ adapted to engage and depress the arm $h^2$ of the lever $h$, to set the brake member $g$ upon the under surface of the table $c$. Acting upon this plunger $i$ as a helical spring $j$, seated in the bore of the cylinder $f$, the normal tendency of this spring being to force the lever arm $h^2$ downward. Opposite to the spring $j$ is a spring $k$ of relatively lighter tension, the function of which is to prevent a too rapid action of the spring $j$ and thus aid in securing a gradual stopping of the turn table $c$.

Mounted in bearings on the side of the cylinder $f$ is a trip lever $m$ one end of which has a latch member $m'$ adapted to pass through an opening $f^2$ in the cylinder $f$ and engage one shoulder of a channel $i'$ in this plunger $i$, thus making said plunger inoperative and holding the spring $j$ under compression until the trip mechanism is actuated to set the brake. The upper end of the trip lever $m$ has adjustably mounted thereon a contact member $n$ adapted to be engaged by the tone arm $b$ and to transmit that movement to the lever $m$ necessary to actuate the latch member $m'$ to release the plunger $i$.

In the drawings, the lever $m$ is shown as having a sleeve $m^2$ in which the contact member $n$ has a sliding fit, a set screw $n'$ being used to fix the member $n$ in its adjusted position. It is not my intention to limit myself to this construction, however, as it is apparent that various other methods of securing adjustability of the contact $n$ may be followed. The arm of the lever $m$ carrying the contact $n$ is shorter than the other, thus insuring a sufficient movement of the latch member $m'$ with slight movement of the contact member $n$, to insure the release of the plunger $i$. A weak spring $o$ adjacent the sleeve $m^2$, serves to actuate the lever $m$ to bring the latch member $m'$ into the channel $i'$ when the brake is being released.

The operation of the herein described device is substantially as follows:—In applying the device to a phonograph, the base $d$ is secured to the cabinet $a$ by means of screws or in any other desired manner, said base being so positioned as to bring the end $h'$ of the lever $h$ beneath the turn table $c$.

Assuming that the parts are in the position shown in dotted lines in Fig. 2, the friction pad or brake shoe $g$ will be in contact with the under side of the table $c$, the beveled surface of said pad or shoe giving the desired extended contact area. This is the normal position of the brake shoe.

When it is desired to set the device to a definite record, the tone arm $b$ is swung until the reproducing needle or stylus is in the last groove of the indicated sound waves upon the record. The contact $n$ is then adjusted in its support so as to be brought into engagement with said tone arm, and the tone arm is then removed from the record. The tongue $h^3$ is then raised to release the brake shoe $g$ or disengage it from the table $c$, the spring $k$ aiding in lifting the lever $h$. The upward movement of said lever will carry with it the plunger $i$, placing the spring $j$ under compression. When the plunger $i$ has been raised to the full extent, the spring $o$ will force the latch member $m'$ through the opening $f^2$ causing it to enter the channel $i'$ where it will be in position to be engaged by the upper shoulder about said channel. This movement of the lever $m$ will project the contact $n$ slightly toward the tone arm $b$. Instantly upon the disengagement of the brake pad or shoe $g$ from the under surface of the table $c$, this table will begin to rotate under its motor, and when it has come to speed, the reproducing needle is inserted in the record groove in the usual manner, said arm being propelled across the record by the spiral groove therein. As the reproducing needle approaches the end of the record groove, the tone arm $b$ will be brought into engagement with the contact $n$, oscillating the lever $m$ against the tension of the spring $o$, thus releasing the latch $m'$ and permitting the spring $j$ to project the plunger $i$ downwardly against the arm $h^2$, of the lever $h$. The depression of this lever will raise the friction pad or brake shoe $g$ and bring it into engagement with the under surface of the table $c$, thus stopping the rotary movement of said table.

In phonographs, the motor must be finely adjusted, as fluctuations in the speed thereof will result in a noticeable interference with the tone quality of the reproduction. The governor used for securing uniformity in the speed of the motor is usually more or less delicate, and it is desirable to stop the machine gradually to avoid unnecessary strains upon the motor or upon the governor, which would gradually tend to throw the motor out of true. To avoid a too sudden stopping of the motor, I employ a comparatively hard friction pad or brake shoe $g$, and at the same time use the spring $k$ opposed to the spring $i$ to prevent an instantaneous application of the full braking power.

The application of the braking force to the unfinished undersurface of the table $c$ through the medium of a fairly hard substance, will result in a gradual stopping of said table, any abrasion resulting from the application of the pad or shoe $g$ not marring the machine in any way. I have found wood fiber to be highly satisfactory in use. By the construction shown, the table is not suddenly stopped, but the stopping is gradual, though rapid. The spring $k$ also serves to hold the brake shoe $g$ out of engagement with the table when the latch $m'$ is in engagement with the plunger $i$.

The herein described device is compact in structure, may in its entirety be set fairly close to the turntable, and may be conveniently operated in starting the device, the action in stopping being entirely automatic. The parts are so arranged as to avoid any possibility of the device getting out of order, and in use the only attention required of the operator is the raising of the tongue $h^3$ of the lever $h$ and the adjustment of the contact $n$.

By the use of a vertical cylinder, a spring $j$ of comparatively light tension may be used, the pressure exerted thereby being slightly multiplied through the use of the lever $h$ interposed between this spring and the friction pad or brake shoe $g$.

It is not my intention to limit myself to the precise details of construction shown in the accompanying drawings, it being apparent that such may be varied without departing from the spirit and scope of the invention.

Having described my invention, what I claim as new and desire to have protected by Letters Patent, is:—

1. An automatic stop for phonographs embodying therein an oscillatory lever, one end of which is adapted to project under a turn table, a friction pad or brake shoe supported by said end, means adapted to depress the other end of said lever whereby said pad or shoe is projected into frictional engagement with the turn table, a trip mechanism embodying therein means coöperating with and adapted to hold said last named means inoperative or release the same, and a contact member adapted to be engaged by a swiveling arm, and means acting upon said lever in opposition to said depressing means whereby movement of said lever in setting the brake shoe is retarded and said brake shoe will be held out of engagement with the turn table when said trip mechanism is set to make the said depressing means inoperative.

2. An automatic stop for phonographs embodying therein an oscillatory lever, one end of which is adapted to project under a turn table, a socket carried by said end, a friction pad or brake shoe seated in said socket, means adapted to depress the other end of said lever whereby said pad or shoe is projected into frictional engagement with the turn table, a trip mechanism embodying therein means coöperating with and adapted to hold said last named means inoperative or release the same, and a contact member adapted to be engaged by a swiveling arm, and means acting upon said lever in opposition to said depressing means whereby movement of said lever in setting the brake shoe is retarded and said brake shoe will be held out of engagement with the turn table when said trip mechanism is set to make the said depressing means inoperative.

3. An automatic stop for phonographs embodying therein an oscillatory lever, one end of which is depressed and adapted to project beneath the pendant rim of a turn table, an upwardly extended socket carried by said depressed end, a friction pad or brake shoe seated in said socket, means adapted to depress the other end of said lever whereby said pad or shoe is projected into frictional engagement with said turn table, a trip mechanism embodying therein means coöperating with and adapted to hold said last named means inoperative or release the same, and a contact member adapted to be engaged by a swiveling arm, and means acting upon said lever in opposition to said depressing means whereby movement of said lever in setting the brake shoe is retarded and said brake shoe will be held out of engagement with the turn table when said trip mechanism is set to make the said depressing means inoperative.

4. An automatic stop for phonographs, embodying therein a vertical cylinder, a reciprocatory plunger mounted therein, a spring having a normal tendency to force said plunger downwardly, a spring of relatively lighter tension than, and opposed to, said first named spring, an oscillatory lever having one end thereof projecting below and adapted to be engaged by said plunger, the other end thereof being adapted to be projected under a turn table, a friction pad or brake shoe carried by said lever and adapted to be forced thereby into engagement with said turn table, and a trip mechanism embodying therein an oscillatory lever, one end of which carries a latch adapted to coöperate with said plunger to hold said spring under compression, a spring acting upon said lever to normally force said latch member into the operative relation with said plunger, and an adjustable contact member carried by the other end of said lever and adapted to be engaged by a swiveling arm.

5. An automatic stop for phonographs, embodying therein a vertical cylinder, a reciprocatory plunger mounted therein, a spring having a normal tendency to force said plunger downwardly, an oscillatory lever having one end thereof projecting below and adapted to be engaged by said plunger, the other end thereof being adapted to be projected under a turn table, a friction pad or brake shoe carried by said lever and adapted to be forced thereby into engagement with said turn table, and a trip mechanism embodying therein an oscillatory lever, one end of which carries a latch adapted to coöperate with said plunger to hold said spring under compression, a spring acting upon said lever to normally force said latch member into the operative relation with said plunger, means adapted to retard the movement of said plunger under its spring, and an adjustable contact member carried by the other end of said lever and adapted to be engaged by a swiveling arm.

6. An automatic stop for phonographs, embodying therein a vertical cylinder, a reciprocatory plunger mounted therein, a spring having a normal tendency to force said plunger downwardly, an oscillatory lever having one end thereof projecting below and adapted to be engaged by said plunger, the other end thereof being adapted to be projected under a turn table, a friction pad or brake shoe carried by said lever and adapted to be forced thereby into engagement with said turn table, and a trip mechanism embodying therein an oscillatory lever, one end of which carries a latch adapted to coöperate with said plunger to hold said spring under compression, a spring acting upon said lever to normally force said latch member into the operative relation with said plunger, a spring acting upon the lower side of said lever whereby the action of said first named spring is retarded when said spring is released to actuate said lever, and an adjustable contact member carried by the other end of said lever and adapted to be engaged by a swiveling arm.

7. An automatic stop for phonographs, embodying therein a vertical cylinder, a reciprocatory plunger mounted therein, said plunger having an annular channel therein adapted to coöperate with the trip mechanism, a spring having a normal tendency to force said plunger downwardly, an oscillatory lever having one end thereof projecting below and adapted to be engaged by said plunger, the other end thereof being adapted to be projected under a turn table, a friction pad or brake shoe carried by said lever and adapted to be forced thereby into engagement with said turn table, a trip mechanism embodying therein an oscillatory lever, one end of which carries a latch adapted to coöperate with said plunger to hold said spring under compression, a spring acting upon said lever to normally force said latch member into the operative relation with said plunger, and an adjustable contact member carried by the other end of said lever and adapted to be engaged by a swiveling arm, and means acting upon said lever in opposition to said spring whereby movement of said lever in setting the brake shoe is retarded, and said brake shoe will be held out of engagement with the turn table when said spring is under compression.

In witness whereof, I have hereunto affixed my signature, in the presence of two subscribing witnesses, this 30th day of October, 1913.

JUDGE Q. A. ROLLINS.

Witnesses:
CLARICE FRANCK,
EUGENE WENING.